United States Patent
Garrett

(10) Patent No.: US 8,528,057 B1
(45) Date of Patent: Sep. 3, 2013

(54) METHOD AND APPARATUS FOR ACCOUNT VIRTUALIZATION

(75) Inventor: Steven Harold Garrett, Westford, MA (US)

(73) Assignee: EMC Corporation, Hopkinton, MA (US)

( * ) Notice: Subject to any disclaimer, the term of this patent is extended or adjusted under 35 U.S.C. 154(b) by 1325 days.

(21) Appl. No.: 11/369,488

(22) Filed: Mar. 7, 2006

(51) Int. Cl.
 *G06F 21/00* (2013.01)

(52) U.S. Cl.
 USPC .......... 726/5; 726/4; 726/6; 726/14; 713/171; 713/175; 455/411; 380/201; 705/42

(58) Field of Classification Search
 USPC ....................................... 726/5, 18
 See application file for complete search history.

(56) References Cited

U.S. PATENT DOCUMENTS

| | | | |
|---|---|---|---|
| 6,144,959 A * | 11/2000 | Anderson et al. | 1/1 |
| 6,934,838 B1 * | 8/2005 | Boyce et al. | 713/156 |
| 7,117,528 B1 * | 10/2006 | Hyman et al. | 726/5 |
| 7,269,729 B2 * | 9/2007 | He et al. | 713/166 |
| 7,343,486 B1 * | 3/2008 | McCarty et al. | 713/155 |
| 2001/0056354 A1 * | 12/2001 | Feit et al. | 705/1 |
| 2002/0095395 A1 * | 7/2002 | Larson et al. | 706/47 |
| 2003/0005280 A1 * | 1/2003 | Bobde et al. | 713/150 |
| 2003/0131264 A1 * | 7/2003 | Huff et al. | 713/202 |
| 2004/0117460 A1 * | 6/2004 | Walsh et al. | 709/219 |
| 2004/0117615 A1 * | 6/2004 | O'Donnell et al. | 713/155 |
| 2004/0210756 A1 * | 10/2004 | Mowers et al. | 713/168 |
| 2004/0210772 A1 * | 10/2004 | Hooker et al. | 713/201 |
| 2005/0015619 A1 * | 1/2005 | Lee | 713/201 |
| 2005/0044423 A1 * | 2/2005 | Mellmer et al. | 713/201 |
| 2005/0091348 A1 * | 4/2005 | Ferri et al. | 709/220 |
| 2005/0108352 A1 * | 5/2005 | Kashitani et al. | 709/207 |
| 2005/0120214 A1 * | 6/2005 | Yeates et al. | 713/171 |
| 2005/0240773 A1 * | 10/2005 | Hilbert et al. | 713/182 |
| 2006/0075224 A1 * | 4/2006 | Tao | 713/164 |
| 2006/0075253 A1 * | 4/2006 | Sonkin et al. | 713/183 |
| 2006/0080197 A1 * | 4/2006 | Chi | 705/35 |
| 2006/0195519 A1 * | 8/2006 | Slater et al. | 709/204 |
| 2006/0218630 A1 * | 9/2006 | Pearson et al. | 726/8 |
| 2007/0056024 A1 * | 3/2007 | Hsu et al. | 726/5 |
| 2007/0083917 A1 * | 4/2007 | Peterson et al. | 726/5 |
| 2007/0136794 A1 * | 6/2007 | Chin et al. | 726/5 |
| 2007/0198664 A1 * | 8/2007 | Satkunanathan et al. | 709/220 |

OTHER PUBLICATIONS

Kupczyk et al, Using Virtual User Account System for Managing Users Account in Polish National Cluster, HPCN Europe 2001, Verlag Berlin Heidelberg 2001, pp. 587-590.*

* cited by examiner

*Primary Examiner* — Morshed Mehedi
(74) *Attorney, Agent, or Firm* — Degrosits & Noah LLP; Todd A. Noah

(57) ABSTRACT

A method, and apparatus for executing the method, that includes creating a virtual account not limited to being associated with any one of a plurality of servers. The method further includes matching at least some authentication credentials of a first server of the plurality of servers with at least some authentication credentials of the virtual account.

17 Claims, 6 Drawing Sheets

METHOD AND APPARATUS FOR ACCOUNT VIRTUALIZATION

FIELD OF THE INVENTION

The present invention relates to a virtualization technique for network accounts.

BACKGROUND

In networked computer systems, network resources (e.g., servers, storage devices, and other computer devices), and clients are commonly interconnected through a network, which allows for communication between them. In networked systems, a directory service may execute on a domain controller and can manage the sharing of information among network components (e.g., network resources and clients) and ensure network security. The directory service on the domain controller can thereby establish a secure domain of network resources and clients.

Servers, services executing on servers, and clients can log onto the directory service and join the network. To enhance the security of the network, network components may possess a security layer service (e.g., the Kerberos security service) that implements a network authentication protocol (e.g., the Kerberos network authentication protocol). The security layer services may provide authentication between various components of the network, and as such, can block unauthorized access by unauthenticated components. Moreover, after the identity of two components has been authenticated via the security layer services, the two components may encrypt their communications (e.g., via the security layer services) so as to ensure privacy and data integrity.

DETAILED DESCRIPTION OF THE INVENTION

Each physical computer in a network can log into the domain controller and have its authentication credentials verified by an authentication engine (also referred to as a directory service) associated with the domain controller. An example of such an authentication engine is Active Directory available in various operating systems from Microsoft Corporation of Redmond, Wash. Similarly, services (e.g., application programs) executing on servers in the network can also log onto the directory service on the domain controller and provide authentication credentials to enable the service to be authenticated. In conventional systems, each service logs in using the account authentication credentials of the server on which the service executes. As such, each service thereafter will be associated with a particular server. When a client desires to access a particular service, the client accesses the service, via the directory service, through reference to the server on which the service resides. In doing so, the service is associated with the server on which it executes, so that if the server is unavailable, for example, due to server failure, connectivity failure, or any other reason, the client may not be able to access the service.

Applicants have appreciated that it may be desirable to enable a service to be de-coupled from any particular server so that it can be moved to another server for any of numerous reasons (e.g., to provide for high availability of the service in the event of a failure of the server on which it initially resides). In one embodiment, this is accomplished via the creation and use of one or more virtual computer accounts in the directory service. In one embodiment, a server and one or more services executing thereon may log onto the directory service using the authentication credentials of a virtual computer account. Clients accessing such services do so via reference to the virtual computer, rather than the physical server on which they are executing. If it becomes desirable to relocate the service(s) (e.g., upon server failure, connectivity failure, or for any other reason), the services may be moved to another server. The other server can also log onto the directory service using the virtual computer account authentication credentials and thereby assume the identity of the virtual computer account. In one embodiment, clients previously accessing the services that were executing on the original server may be unaware of any changes, since they still can access these services through reference to the same virtual computer account.

Figure 1:
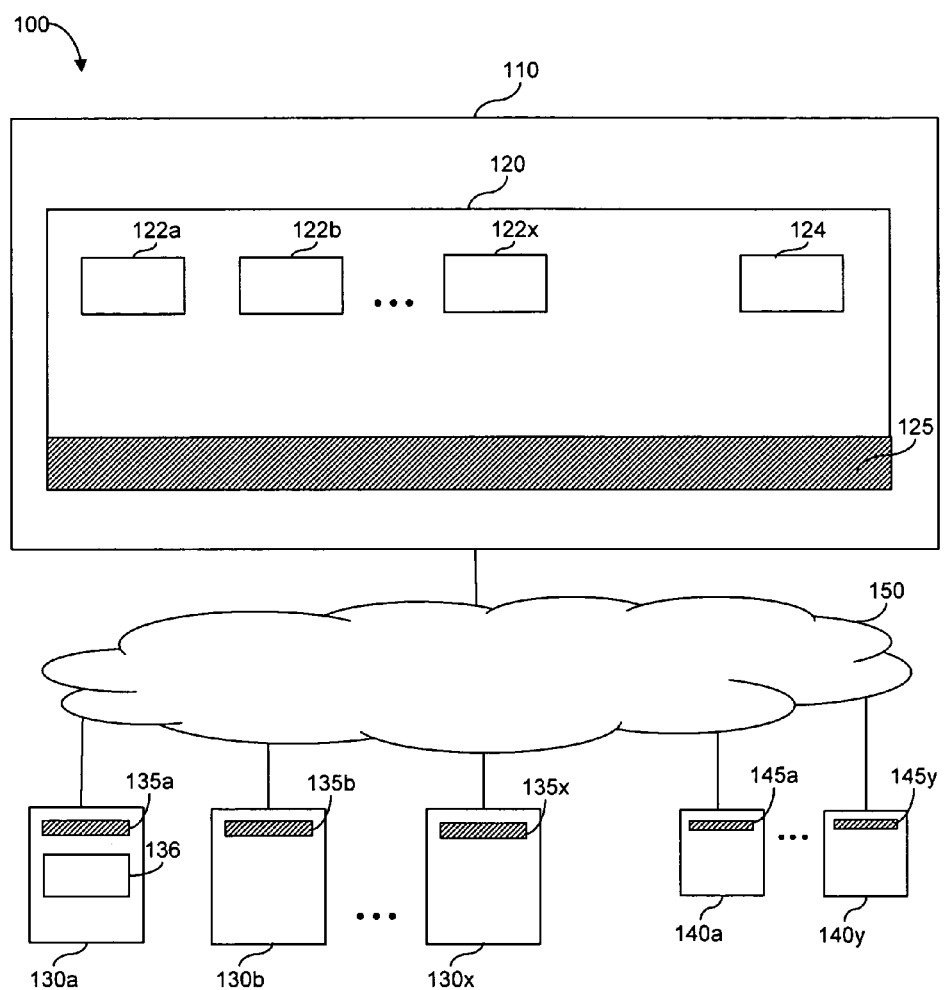
FIG. 1 is a block diagram of a computer system that includes a virtual computer account, in accordance with one embodiment of the invention.

FIG. 1 illustrates a computer system 100 that includes a virtual computer account in a directory service, in accordance with one embodiment of the invention. The computer system 100 includes a domain controller 110 on which a directory service 120 executes. The domain controller is a server that can handle security authentication requests (e.g., logins, checking permissions, etc.) for network resources and clients. Some networks may include more than one domain controller. In some arrangements of multiple controllers, a central domain controller may serve as a primary domain controller and other domain controllers serve as backup domain controllers, and in other networks, all domain controllers can be equal, with no one domain controller assuming the role of a primary domain controller. The aspects of the present invention described herein are not limited to use in a system having any particular type of domain controller architecture and can be used with any domain controller arrangement.

The directory service 120 executes on the domain controller 110 and can direct the central management and sharing of information among the network components, while also acting as a central authority for network security. As such, the directory service 120 establishes a domain of network resources and clients that are part of the network.

System 100 also includes a number of servers 130a, 130b, to 130x and a number of clients 140a to 140y. The domain controller 110, the servers 130a-130x, and the clients 140a-140y can communicate via network 150. Network 150 may be implemented via any suitable communications protocol and/or infrastructure (e.g., a LAN, WAN, the Internet, other networks, or a combination thereof), as the aspects of the present invention described herein are not limited in this respect.

Services can execute on one or more servers 130a-130x, and may be accessible to the clients 140a-140y. In the illustration of FIG. 1, a service 136 executes on server 130a and clients 140a-140y may access service 136 through the network 150. Services can include any type of programs, for example, email server services, web servers, database services, and any other application program, as the invention is not limited to any particular type of service. Examples of email server services are the Microsoft Exchange Server® email server offered by Microsoft Corporation of Redmond, Wash., and the Lotus Domino® email server offered by International Business Machine Corporation of Armonk, N.Y.

Servers 130a-130x, any services executing thereon (e.g., service 136 executing on server 130a), and clients 140a-140y all can log onto the directory service 120 via the submission of appropriate account authentication credentials. An example of account authentication credentials is an account name and password, although the present invention is not limited by either the type of account authentication credentials or the manner in which the directory service performs authentication. The directory service 120 can compare the submitted account authentication credentials to credentials that the directory service 120 has stored in account objects. If the submitted authentication credentials match those stored in the account object, the servers 130a-130x, services (e.g., service 136), and/or clients 140a-140y attempting to login are allowed to log onto the directory service 120.

For the sake of illustration, the schematic of FIG. 1 shows some account objects that may be stored by the directory service 120, namely account objects 122a, 122b, to 122x associated with the servers 130a, 130b, to 130c, respectively. Each account object can include attributes designating the account, including a Domain Name Service (DNS) host name, a security account name (e.g., a security account manager name), and a password. In some embodiments, a password may include a string of data, for example a string of characters or bits. It should be appreciated that in the context of the following descriptions, a password can also refer to a string of data that may be derived from another string of data, as the invention is not limited so. For example, a password can be a string of data derived from another string of data using a one-way hash function, or any other suitable function. The descriptions provided herein are merely illustrative, as the aspects of the invention described herein are not limited to use within a directory service that maintains any particular type or format of information in the account objects.

System 100 includes security layers on servers 130a-130x, clients 140a-140y, and domain controller 110. In FIG. 1, the domain controller 110 includes a security layer 125, the servers 130a-130x include security layers 135a-135x, and the clients 140a-140y include security layers 145a-145y. The security layers can be services, hardware, or combinations thereof, that implement a cryptography communication protocol enabling network components to securely prove their identity to each other via communication across the network 150. In addition, the security layers can also encrypt communications between these components so as to ensure privacy and data integrity. Security layers can be beneficial where the network 150 includes insecure communication connections, but it should be appreciated that such security layers may also be implemented for secure networks. An example of such a security layer is the Kerberos security service that can implement the Kerberos network authentication protocol. The security layers described are merely illustrative, as aspects of the invention are not limited to use on a system using these or any particular security techniques.

In accordance with one embodiment, system 100 includes a virtual computer account object 124 that resides on the directory service 120. Unlike server account objects 122a-122x, the virtual computer account object 124 need not be associated with any specific physical network component. Network components, such as servers and services executing thereon, can log onto directory service 120 via the submission of authentication credentials associated with the virtual computer account object 124, henceforth also referred to as virtual credentials. A network component that logs on to directory service 120 using the virtual credentials is associated with the virtual account. In accordance with one embodiment, a service (e.g., service 136 executing on server 130a) that logs onto the directory service 120 via the submission of virtual credentials associated with a virtual computer account (e.g., account 124), need not necessarily be restricted to execute on the server it is executing upon when it logs in (e.g., service 136 need not be restricted to execute only on server 130a).

Figure 2:
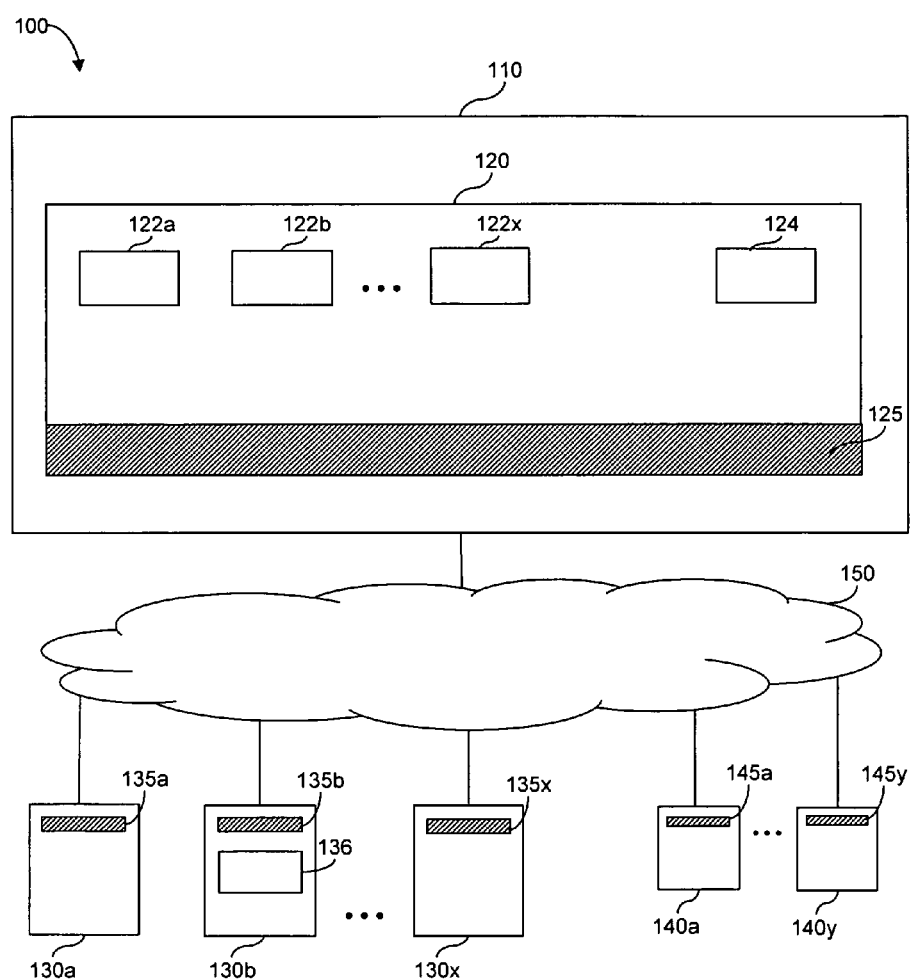
FIG. 2 illustrates the computer system in FIG. 1, with a service that logged onto the directory service via submission of authentication credentials associated with the virtual computer account and after being moved to another sever, in accordance with one embodiment of the invention.

FIG. 2 illustrates an example where the service 136 had logged onto the directory service 120 via the submission of virtual credentials associated with the virtual computer account 124 (from server 130a as shown in FIG. 1), but wherein, the service 136 is relocated from server 130a to server 130b, as shown in FIG. 2. In one embodiment, clients 140a-140y accessing the service 136 can still reference service 136 via a reference to the same virtual account since service 136 is still associated with the virtual computer account object 124 rather than an account for the specific server (i.e., server 130b) on which the service 136 is executing.

As should be appreciated from the foregoing, in accordance with one embodiment, a virtual computer account object may be created in a directory service from an originating server. The authentication credentials (e.g., password and/or account name) associated with the originating server's account can be modified locally and in the directory service so as to match the authentication credentials of the virtual computer account in a manner described below. Thus, services executing on the originating server may log onto the directory service using authentication credentials associated with the virtual computer account. Furthermore, in some embodiments, the matching of the authentication credentials of a server and a virtual computer account may be performed without rebooting the server.

Figure 3:
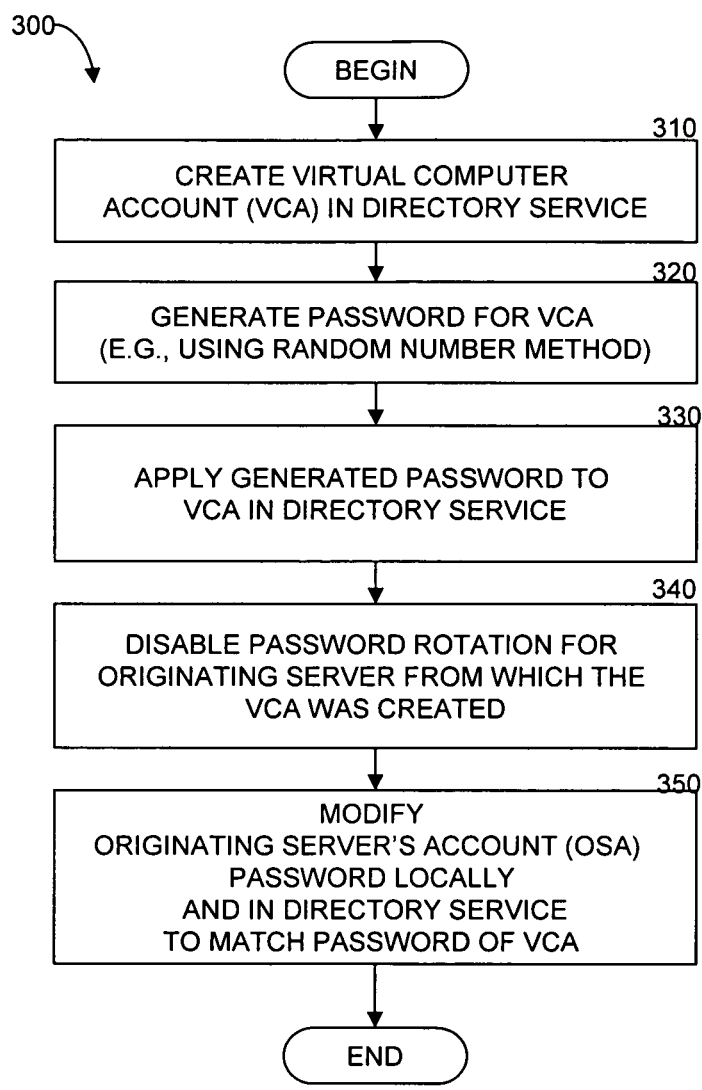
FIG. 3 is a flowchart of a process that creates a virtual computer account and modifies appropriate passwords so as to enable the use of the virtual computer account, in accordance with one embodiment of the invention.

FIG. 3 illustrates a process 300 that can be utilized to create a virtual computer account in a directory service and modify account passwords so as to enable the use of the virtual computer account. This is just an example of a process that allows services to log into the directory service using virtual accounts, and can be modified in numerous ways, as the invention is not limited in this respect. Process 300 may be performed by a program executing on one or more servers. In one embodiment, an availability manager program running on one or more servers (and/or other network computers that are not servers) performs process 300. For example, a program executing process 300 may execute on server 130a, but it should be appreciated that this is just one example, as process 300 may be executed on any one or more servers in the network, as the invention is not limited in this respect. As an alternative to, or in addition to process 300 being performed by a program executing on one or more servers, process 300 may be performed manually, via a script, and/or via any other method, as the invention is not limited in this respect. Process 300 may generate a single virtual account or multiple distinct virtual computer accounts.

Prior to creating the virtual account on the directory service, the originating server, on which process 300 may be executing, logs onto the directory service using account authentication credentials associated with the originating server account in directory service. In one embodiment, the originating server may also log onto the directory service as an administrator so as to gain authorization to create a virtual account. The originating server is not limited to log in as administrator, as the server can be given authorization to create virtual account in any way.

Process 300 begins in act 310, wherein a virtual computer account is created in the directory service. To create the virtual account, the directory service may request a number of attributes. These attributes may include a domain name service (DNS) host name, a security account name, and a virtual computer account name. The DNS host name can consist of a virtual DNS address and may not necessarily be the same DNS host name associated with the originating server. The security account name may be an account name used by a security account manager, and the virtual computer name may be a name by which the virtual computer account will be referred to as. The security account name may be the same as the virtual computer name or may be different. The virtual computer account can also include a password attribute which may be generated and supplied by the steps of process 300 that follow.

Process 300 proceeds to act 320, where a password for the virtual computer account may be generated. The password generation method can employ any suitable method as the invention is not limited to any technique. For example, a random number method may be used to generate a sufficiently random password, comprising a string of data, so as to ensure a sufficient level of security. In one embodiment, a random number generator is used to generate a password that is N characters long, where N is a positive integer. Each character can be selected based on a random number provided by the random number generator, or using any other suitable method. The number of characters, N, which form the password may be predetermined or may also be randomly selected. In one embodiment, the password is 1024 characters long. As another example, a password with a shorter length may be generated and supplied to a one-way hash function which can in turn generate a password having a longer length. The generation of a password is just one example of authentication information generation, and other embodiments may involve the generation of any other authentication information, not limited only to passwords.

In act 330, the password generated in act 320 is applied to the virtual computer account object in the directory service. In doing so, process 300 can create a computer account, in the directory service, which is not associated with a physical server and, hence, is referred to as a virtual computer account. It should be appreciated that the directory service may not have any indication that the virtual computer account is not associated with a physical server. From the perspective of the directory service and any clients, the virtual computer account may be indistinguishable from an account associated with a physical computer. In the acts that follow, process 300 may proceed to modify other settings so as to enable the use of the newly created virtual computer account.

In act 340, any pre-existing password rotation programs executing on the originating server, from which the virtual computer account was created, may be disabled. Password rotation programs, such as the "netlogon" password rotation service in the Microsoft Windows® operating system, offered by Microsoft Corporation, attempts to modify a password after a certain specified amount of time has passed, for example, about 30 to 60 days, so as to increase network security. In the case of the Microsoft Windows® operating system, the pre-existing password rotation program may be disabled by setting the registry key from 0 to 1. In the embodiment shown, the pre-existing password rotation programs are disabled because in the next act (350) the passwords of the virtual account and the originating server account will be set to match. The disabling of any pre-existing password rotation programs may be desired so as to prevent the pre-existing password rotation program from later only modifying the password of the originating server account which could result in a mismatch with the password of the newly created virtual account. It should be understood that the invention is not limited to just this embodiment, and other approaches for authentication information modification are possible.

In act 350, the password associated with the originating server account may be modified both locally (i.e., on the server) and in the corresponding server account object in the directory service, so as to match the password of the virtual computer account. In some embodiments, act 350 may be performed without rebooting the originating server. In the case of the Kerberos security layer services, a request to modify the password may be initiated by creating a memory area on the originating server than holds a PKERB_SET-PASSWORD_REQUEST structure with appropriate password details, where such a process may be accomplished in part by using the LsaConnectUntrusted, LsaLookupAuthenticationPackage, and LsaCallAuthenticationPackage functions. The security layer of the originating server may then communicate the request to modify the password to the directory service. If the directory service accepts the request to modify the password and modifies the password in the server account object in the directory service, then a message can be sent back to the originating server which can then implement a local modification of the password. Such a process may be performed during run-time and need not necessarily involve rebooting of the servers. As a result, the directory service can modify the password attribute of the originating server account object. Via such a process, a server's account password, stored both locally and in the server account object in directory service, may be modified so that the password matches the virtual computer account password, thereby resulting in a matching of these passwords.

Alternatively, or additionally, the password (or other authentication information) of the virtual account can be selected (if the virtual computer account password has yet to be defined) or modified (if the virtual computer account password has previously been defined) to match the password of the originating server, as the invention is not limited in this respect. For example, the password of the originating server can remain unchanged, and the password of the virtual account can be set to the password of the originating server.

Process 300 ensures that the security layer passwords are modified accordingly so as to enable the use of a virtual computer account. Upon completion of process 300, a service executing on the originating server (from which the virtual computer account was created) can log on to the directory service using the authentication credentials associated with the virtual computer account. From the perspective of the directory service and any clients using the aforementioned service, the service will be perceived as executing on a server associated with the virtual computer account. As such, if the originating server fails, or it is otherwise desired, the service can be relocated to any other server that logs onto the directory service using the account authentication credentials of the virtual account. Upon relocation to such a server, the application can log onto the directory server using the authentication credentials of the virtual account. In one embodiment, an availability manager program running on one or more servers, other network computers, or combinations thereof, manages the relocation of the service to any other server and may maintain availability of the service.

Prior to moving the service to another server, henceforth referred to as a destination server, the destination server account authentication information (e.g., password) and the virtual account authentication information (e.g., password) can be matched, which may be accomplished via similar techniques as described for the originating server. For example, a determination can be made as to whether the passwords match, and if the passwords do not match, then the destination server account password can be modified both locally and in the directory service so as to match the virtual account password. Alternatively, or additionally, the virtual account password can be modified so as to match the password of the destination server account. Furthermore, in some embodiments, the authentication information of various accounts may be modified so that the authentication information of the originating server and the virtual account do not match, and the authentication information of the destination server and the virtual account do match. Also, any pre-existing password rotation program executing on the destination account server can be disabled for reasons similar to those discussed above in connection with the originating server. In embodiments where an availability manager is present, one or more of the above-mentioned actions may be performed in response to the availability manager relocating a service from a first server (e.g., the originating server) to a second server (e.g., the destination server).

As previously mentioned, pre-existing password rotation programs can be disabled in act 340 to ensure that the passwords of the virtual computer account and the originating server account remain the same after being matched (e.g., in act 350). If not disabled, a password rotation program might modify the password of the originating server account. As a result, the virtual computer account password and the originating server account password might no longer match. In an alternate embodiment, a modified password rotation process may be implemented which modifies both the virtual computer account and originating server account password so that both passwords match. The modified password rotation process may be performed by a modified password rotation program which can execute on the originating server, or by any other program executing on any other suitable computer, as the embodiment that employs a modified password rotation program is not limited to any particular implementation.

Figure 4:
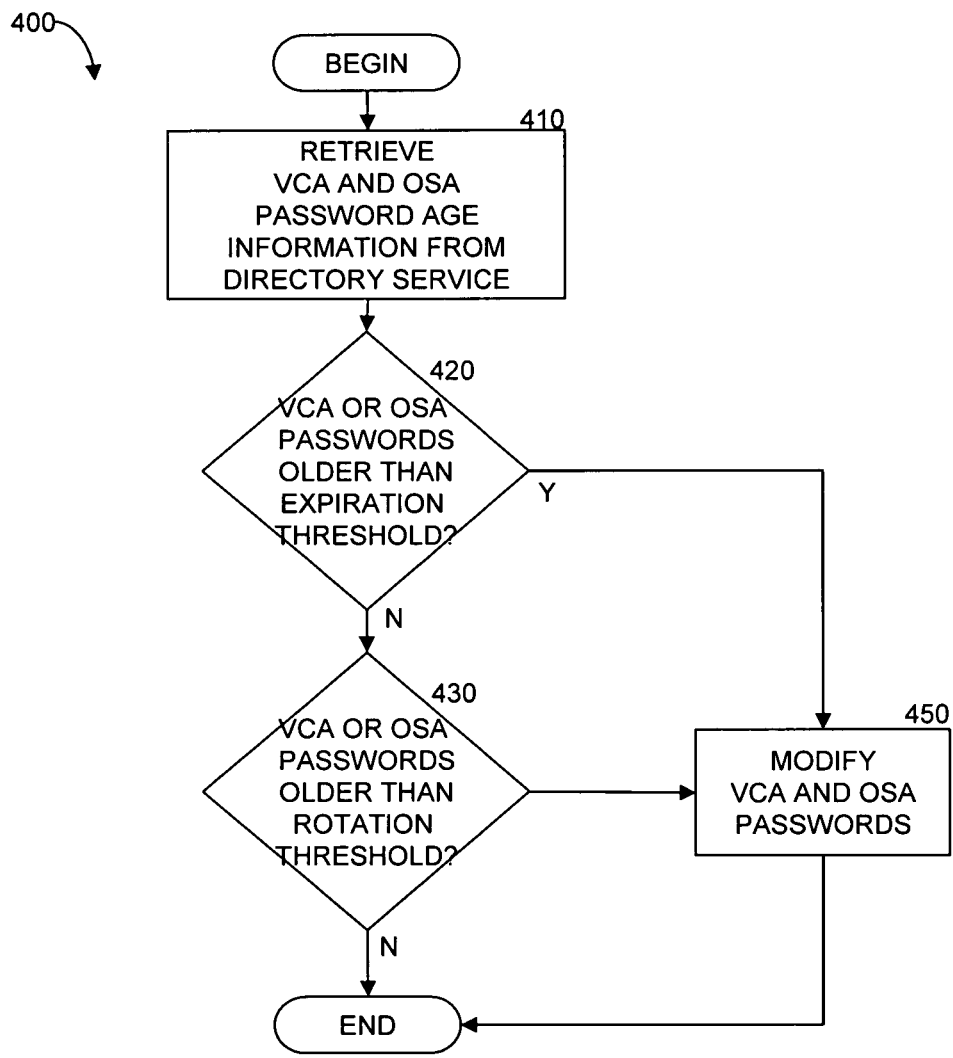
FIG. 4 is a flowchart of a password rotation process for a virtual computer account, in accordance with one embodiment of the invention.

FIG. 4 shows one illustrative implementation of a password rotation process 400, which may be performed by the originating server from where the virtual computer account is created and/or by any other server(s), as the invention is not limited in this respect. Process 400 may be executed at any desired time. In one embodiment, it can be executed multiple times according to a desired password rotation schedule. For example, process 400 may be executed at specified times (e.g., every certain number of hours, for example, every eight hours) when one or more services have logged onto the directory service using authentication credentials associated with a virtual computer account, although the invention is not limited to execution according to a set schedule.

In act 410, information associated with the age of the passwords for the virtual computer account and the originating server account is retrieved. This information can be stored anywhere. In one embodiment, such information is retrieved from the directory service. The information retrieved may include date and time information describing when the passwords were last changed, password attribute values which indicate that the passwords should be immediately changed, and/or any other suitable information.

For example, in the case of the directory service implemented in the Microsoft Windows® operating system (i.e., Active Directory), a password status that indicates whether a password has expired and should be presently changed can be communicated with a PASSWORD_MUST_CHANGE code. Such a code indicates that the password should be immediately modified. The PASSWORD_MUST_CHANGE code may be sent by the directory service upon determination that a password was last modified at a time greater than a password expiration threshold. The password expiration threshold can be a password policy parameter, which indicates that a password should be immediately changed upon discovery that the password's age is greater than or equal to the password expiration threshold. In addition to this threshold, a password rotation threshold may also be defined, which may be defined as a percentage of the password expiration threshold (e.g., half of the password expiration threshold) and which indicates that a password may be modified when the password's age is greater than or equal to the password rotation threshold. It should be appreciated that these are just illustrations, as the invention is not limited in this respect.

Via use of the password rotation threshold, a situation may be avoided where passwords for multiple network components (e.g., servers) on a network domain are all modified at the same time upon discovery of the expiration of the multiple passwords. For example, this may occur upon startup of multiple servers. In contrast, via the use of the password rotation threshold, passwords associated with servers in the domain may be rotated at any time when it is discovered that the password age is greater than the password rotation threshold.

Upon retrieving password age information from the directory service, process 400 may proceed to act 420, where it is determined whether the virtual computer account or the originating server account passwords have an age that is greater than or equal to the password expiration threshold value. For example, as previously indicated, in the case of the Microsoft Windows® operating system, the PASSWORD_MUST_CHANGE status code may be used to determine whether any passwords are older than the expiration threshold value. If one or both of these passwords are older than the password expiration threshold value, process 400 proceeds to act 450, where the passwords for both the virtual computer account and the originating server account are modified, as described further below.

If it is determined (in act 420) that the virtual computer account or originating server account passwords are not older than the expiration threshold, process 400 proceeds to act 430, where it is determined whether the virtual computer account or the originating server account passwords are older than the password rotation threshold. When this is true, the process again proceeds to act 450, where the virtual computer account and originating server account passwords are both modified. If it is determined (in act 430) that the virtual computer account and originating server account passwords are not older than the rotation threshold, then the process terminates. Similarly, upon modification of the virtual computer account and originating server account passwords (in act 450), the process 400 also terminates.

It should be understood that process 400 is merely illustrative. The invention is not limited to the above embodiment, and other embodiments can rotate passwords and keep passwords consistent in other ways. Also, as described above, the process can be used with other authorization techniques which need not even use a password.

Figure 5:
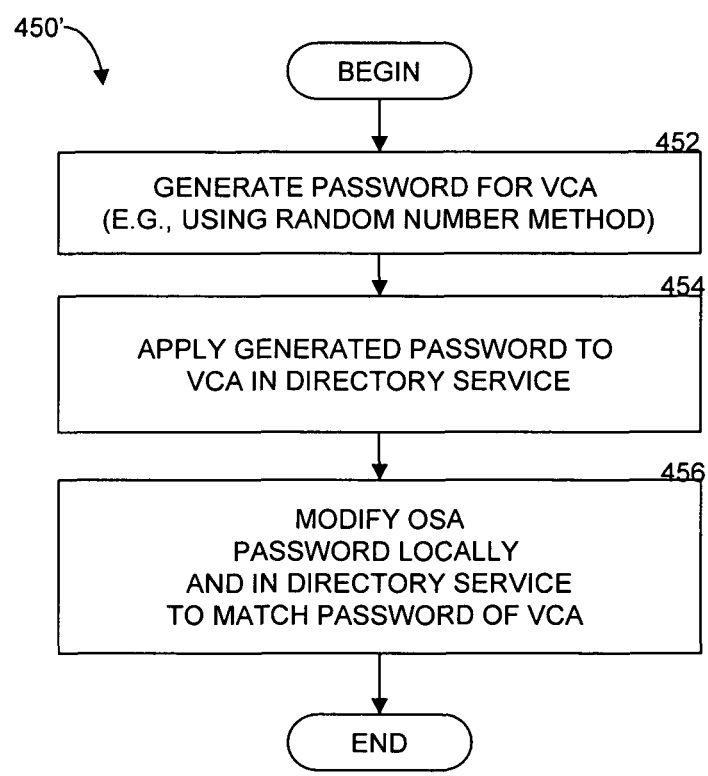
FIG. 5 is a flowchart of a password modification process for a virtual computer account, in accordance with one embodiment of the invention.

FIG. 5 illustrates an embodiment of a password modification process 450' that may be used to implement the act 450 of process 400. The password modification process 450' is similar to the steps in process 300 of FIG. 3, except that the acts of creating the virtual computer account in the directory service (act 310) and the act of disabling pre-existing password rotation programs (act 340) need not be present. As in process 300, process 450' may include acts of generating a password for the virtual computer account, for example, using a random number generator (act 452), applying the generated password to the virtual computer account in directory service (act 454), and modifying the originating server account password both locally and in directory service so as to match the password of the virtual computer account (act 456). Process 450' is just one example of a password modification process, and alternate processes can be implemented in different ways.

Figure 6:
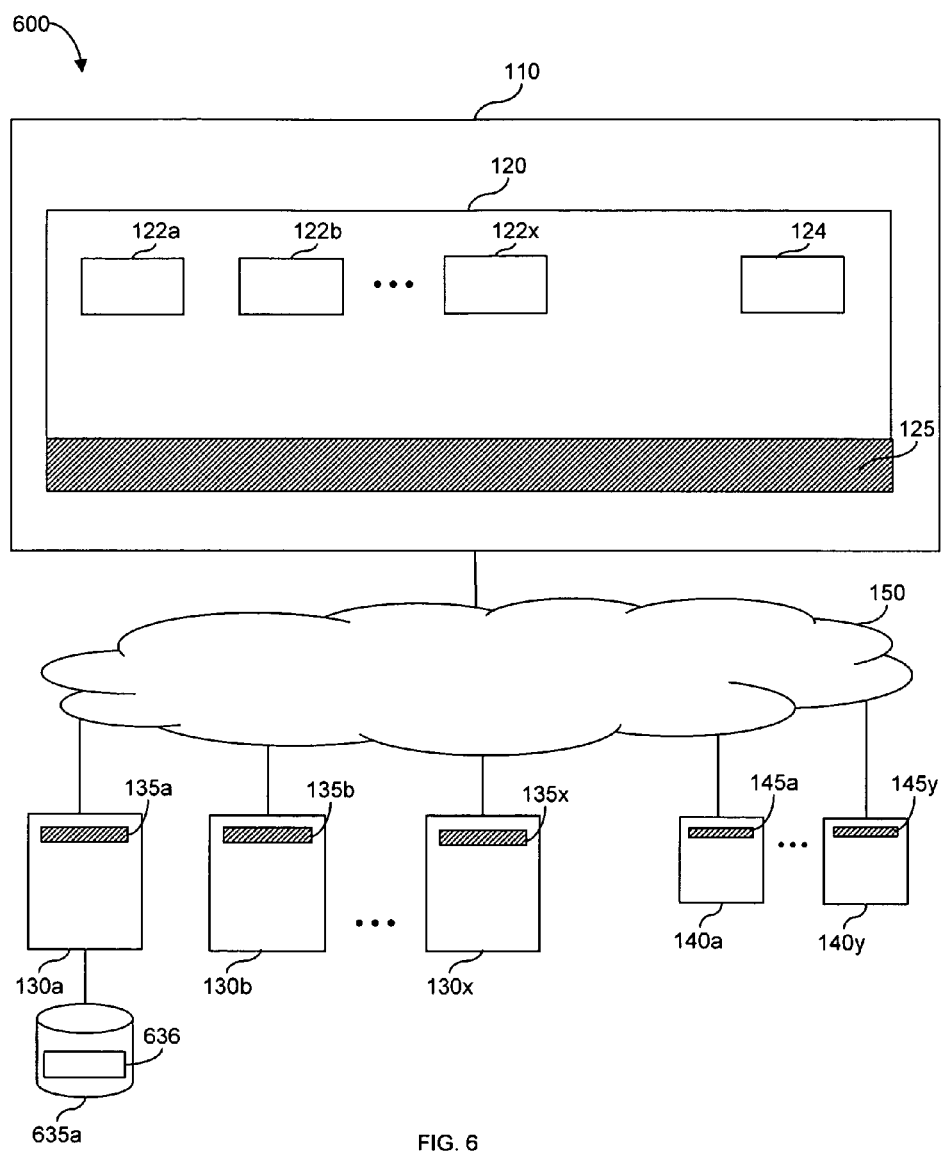
FIG. 6 is a block diagram of a computer system that includes a virtual computer account which can be used by a file share, in accordance with one embodiment of the invention.

It should be appreciated that although the aforementioned processes have been described with respect to a service logging onto a directory service using a virtual computer account, other resources that are associated with physical servers may also log onto directory service using the virtual credentials of the virtual computer account. For example, in the embodiment illustrated in FIG. 6, a file share 636 (i.e., files which can be accessed by network components and clients) may be initially dependant on physical storage device 635a of server 130a from which a virtual computer account 124 is created. Server 130a and file share 636 may log onto the directory service 120 using the credentials associated with the virtual computer account 124. From the perspective of both the directory service 120 and the clients 140a-140y, the file share 636 is associated with the virtual computer account 124, and not any physical server account 122a-122x. As a result, upon failure of server 130a and/or for any other reason, the file share 636 may be relocated to any physical storage device on one of the other servers (e.g., 130b-130x), and the client's 140a-140y may still access the file share 636 via reference to the virtual account, since the file share 636 can still be associated with the virtual computer account 124. Therefore, via the use of such virtual computer accounts and processes that appropriately modify the security layer passwords, a system 600 may provide greater availability of services and resources associated with a network.

As should be appreciated from the foregoing, there are numerous aspects of the present invention described herein that can be used independently of one another, including the aspects that relate to creating a virtual account in a directory service, modifying authentication information for virtual accounts and/or server accounts, and rotating authentication information for accounts.

It should also be appreciated that in some embodiments, all of the above-described features can be used together, or any combination or subset of the features described above can be employed together in a particular implementation, as the aspects of the present invention are not limited in this respect.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. It should be appreciated that any component or collection of components that perform the functions described above can be generically considered as one or more controllers that control the above-discussed functions. The one or more controllers can be implemented in numerous ways, such as with dedicated hardware, or with general purpose hardware (e.g., one or more processors) that is programmed using microcode or software to perform the functions recited above.

It should be appreciated that the various methods outlined herein may be coded as software that is executable on one or more processors that employ any one of a variety of operating systems or platforms. Additionally, such software may be written using any of a number of suitable programming languages and/or conventional programming or scripting tools, and also may be compiled as executable machine language code. In this respect, it should be appreciated that one embodiment of the invention is directed to a computer-readable medium or multiple computer-readable media (e.g., a computer memory, one or more floppy disks, compact disks, optical disks, magnetic tapes, etc.) encoded with one or more programs that, when executed, on one or more computers or other processors, perform methods that implement the various embodiments of the invention discussed above. The computer-readable medium or media can be transportable, such that the program or programs stored thereon can be loaded onto one or more different computers or other processors to implement various aspects of the present invention as discussed above.

It should be understood that the term "program" is used herein in a generic sense to refer to any type of computer code or set of instructions that can be employed to program a computer or other processor to implement various aspects of the present invention as discussed above. Additionally, it should be appreciated that according to one aspect of this embodiment, one or more computer programs that, when executed, perform methods of the present invention need not reside on a single computer or processor, but may be distributed in a modular fashion amongst a number of different computers or processors to implement various aspects of the present invention.

Various aspects of the present invention may be used alone, in combination, or in a variety of arrangements not specifically discussed in the embodiments described in the foregoing, and the aspects of the present invention described herein are not limited in their application to the details and arrangements of components set forth in the foregoing description or illustrated in the drawings. The aspects of the invention are capable of other embodiments and of being practiced or of being carried out in various ways. Various aspects of the present invention may be implemented in connection with any type of network, cluster or configuration. No limitations are placed on the network implementation.

Accordingly, the foregoing description and drawings are by way of example only.

Also, the phraseology and terminology used herein is for the purpose of description and should not be regarded as limiting. The use of "including," "comprising," or "having," "containing," "involving," and variations thereof herein, is meant to encompass the items listed thereafter and equivalent thereof as well as additional items.

What is claimed:
1. A method comprising:
(A) creating a virtual account in a directory service having access to a plurality of servers, wherein the virtual account is not specifically associated with any one of the servers;
(B) modifying authentication credentials of a first server and/or the virtual account so that the authentication credentials of the first server and the virtual account match;

(C) logging an application program, executing on the first server, into the directory service using the authentication credentials of the virtual account; and (D) managing the relocation of an application program between the first server and a second server to maintain availability of the application program using the virtual account.

2. The method of claim 1, wherein (B) is performed without rebooting the first server.

3. The method of claim 1, further comprising, subsequent to performing (B):

(E) modifying the authentication credentials of the first server and/or the virtual account so that the authentication credentials of the first server and the virtual account do not match; and then (F) modifying authentication credentials of a second server and/or the virtual account so that the authentication credentials of second server and the virtual account match.

4. The method of claim 3, further comprising logging the application program, executing on the second server, into the directory service using the authentication credentials of the virtual account.

5. The method of claim 3, wherein and (F) are performed in response to the relocation of the application program from the first server to the second server.

6. A computer program product, comprising a non-transitory computer usable medium having a computer readable program code embodied therein, the computer readable program code comprising:

(A) code for creating a virtual account in a directory service having access to a plurality of servers, wherein the virtual account is not specifically associated with any one of the servers;

(B) code for modifying authentication credentials of a first server and/or the virtual account so that the authentication credentials of the first server and the virtual account match;

(C) code for logging an application program, executing on the first server, into the directory service using the authentication credentials of the virtual account; and (D) code for managing the relocation of an application program between the first server and a second server to maintain availability of the application program using the virtual account.

7. The computer program product of claim 6, wherein (B) is executed without rebooting the first server.

8. The computer program product of claim 6, further comprising:

(E) code for modifying the authentication credentials of the first server and/or the virtual account so that the authentication credentials of the first server and the virtual account do not match; and (F) code for modifying authentication credentials of a second server and/or the virtual account so that the some authentication credentials of the second server and the virtual account match.

9. The computer program product of claim 8, further comprising code for logging the application program, executing on the second server, into the directory service using the authentication credentials of the virtual account.

10. The computer program product of claim 8, wherein (E) and (F) are executed in response to the relocation of the application program from the first server to the second server.

11. At least one computer for use in a computer system comprising a plurality of servers, the plurality of servers comprising at least a first server and a second server, the at least one computer comprising at least one processor programmed to:

create a virtual account in a directory service having access to a plurality of servers, wherein the virtual account is not specifically associated with any one of the plurality of servers;

modify authentication credentials of the first server and/or the virtual account so that the authentication credentials of the first server and the virtual account match;

log an application program, executing on the first server, into the directory service using the authentication credentials of the virtual account; and manage the relocation of an application program between the first server and a second server to maintain availability of the application program using the virtual account.

12. The computer of claim 11, wherein the processor is further programmed to modify authentication credentials without rebooting the first server.

13. The computer of claim 11, wherein the processor is further programmed to, subsequent to modifying authentication credentials of the first server and/or the virtual account to match:

modify the authentication credentials of the first server and the virtual account so that the authentication credentials of the first server and the virtual account do not match;

modify authentication credentials of the second server and/or the virtual account so that the authentication credentials of the second server and the virtual account match; and log the application program, executing on the second server, into the directory service using the authentication credentials of the virtual account.

14. The computer of claim 11, wherein the computer comprises at least one of the plurality of servers.

15. The computer of claim 11, wherein the computer is separate from the plurality of servers.

16. The method of claim 1, further comprising, prior to the modifying step:

disabling a password rotation method in the first server.

17. The method of claim 1, further comprising:

enabling a password rotation method that modifies authentication credentials for both the first server and the virtual account at the same time according to a password rotation schedule.

\* \* \* \* \*